US006871833B1

(12) United States Patent
Zeh et al.

(10) Patent No.: US 6,871,833 B1
(45) Date of Patent: Mar. 29, 2005

(54) DISC DRIVE SHOCKING STATION WITH HIGH SPEED SPOOL VALVE ACTUATION

(75) Inventors: Mark A. Zeh, Mountain View, CA (US); Jacob D. Levine, Oakdale, MN (US)

(73) Assignee: Seagate Technology LLC, Scotts Valley, CA (US)

(*) Notice: Subject to any disclaimer, the term of this patent is extended or adjusted under 35 U.S.C. 154(b) by 225 days.

(21) Appl. No.: 09/612,394

(22) Filed: Jun. 29, 2000

Related U.S. Application Data

(60) Provisional application No. 60/141,621, filed on Jun. 30, 1999.

(51) Int. Cl.[7] .......... F16K 31/02

(52) U.S. Cl. .......... 251/14; 251/58; 251/129.2; 251/234

(58) Field of Search .......... 251/14, 58, 129.1, 251/129.2, 234, 233, 231; 73/12.01

(56) References Cited

U.S. PATENT DOCUMENTS

| | | | | |
|---|---|---|---|---|
| 1,392,952 A | | 10/1921 | Link | |
| 1,416,391 A | * | 5/1922 | Brunt | 251/234 |
| 3,082,633 A | * | 3/1963 | Rabinow | 251/129.2 X |
| 3,244,394 A | | 4/1966 | Fattor | 251/137 |
| 3,603,559 A | * | 9/1971 | Totten | 251/129.2 |
| 4,071,047 A | | 1/1978 | Greene | 137/625.18 |
| 4,074,613 A | * | 2/1978 | Muntjanoff | 251/231 X |
| 4,076,046 A | | 2/1978 | Hieronymus et al. | 137/627.5 |
| 4,252,296 A | | 2/1981 | Berg | 251/138 |
| 4,265,343 A | * | 5/1981 | Stevens | 188/181 T |
| 4,268,009 A | | 5/1981 | Allen, Jr. | 251/138 |
| 4,474,357 A | * | 10/1984 | Noffke | 251/233 |
| 4,586,013 A | * | 4/1986 | Linkner, Jr. | 251/129.2 X |
| 5,711,347 A | | 1/1998 | Sturman et al. | 137/625.65 |
| 5,984,259 A | | 11/1999 | Najmolhoda et al. | 251/50 |
| 5,992,821 A | | 11/1999 | Rookes et al. | 251/129.1 |

* cited by examiner

*Primary Examiner*—Eric Keasel
(74) *Attorney, Agent, or Firm*—Westman, Champlin & Kelly

(57) ABSTRACT

The present invention includes a disc drive shocker having a fast valve which can be moved from a full on position to a full off position within a desired interval of time to impart a shock to a disc drive. The valve is connected to a valve actuator which moves the valve spool within the valve housing. The valve actuator is connected to the valve spool though a lever. The lever is pivotable about a fulcrum. The pivot point of the fulcrum is adjusted, away from center, such that the end of the lever connected to the valve spool moves more quickly than the end of the lever connected to the valve actuator.

20 Claims, 4 Drawing Sheets

DISC DRIVE SHOCKING STATION WITH HIGH SPEED SPOOL VALVE ACTUATION

CROSS-REFERENCE TO RELATED APPLICATION

Reference is hereby made to, and priority is hereby claimed from, U.S. Provisional Patent Application Ser. No. 60/141,621, filed on Jun. 30, 1999 and entitled HIGH SPEED SPOOL VALVE ACTUATION.

FIELD OF THE INVENTION

The present invention relates to disc drives. More specifically, the present invention relates to a shocking or testing apparatus for disc drives.

BACKGROUND OF THE INVENTION

Conventional disc drives include a housing which houses one or more rotatable data storage discs, which store data. Magnetic disc drives, for instance, store magnetic flux reversals on the surface of the disc. As the disc rotates the flux reversals are sensed by a read head which, in turn, generates a read signal indicative of the flux reversals on the disc surface. The flux reversals represent encoded data which is stored on the surface of the disc.

Optical disc drives store data in much the same way, except that instead of using magnetic flux reversals, optical disc drives alter the optical properties of the disc surface in a way which is indicative of the data to be stored. As the disc rotates, an optical transducer generates a read signal indicative of data to be read from the data storage surface on the disc.

In both such disc drives the discs are rotated relative to the transducers so the transducers can read from, or write to, the disc surfaces. In some disc drives, the transducers actually contact the disc surface, as the surface is being accessed, to write or retrieve data. In other disc drives, momentary or intermittent contact is made with the disc surface. In still other disc drives, the data head is attached to a slider which includes an air bearing surface. As the disc rotates, hydrodynamic forces, aerodynamic forces, or a combination of forces, act on the air bearing surface to lift the transducer off the surface of the disc such that the transducer "flies" over the disc surface.

Conventional disc drives must meet certain specifications for physical robustness. Therefore, the disc drives are subjected to physical shocks. The drives are then tested to determine whether the drives operate appropriately during, and/or after, the physical shock is imparted to the disc drive.

SUMMARY OF THE INVENTION

In one disc drive test device, the disc drive is mounted to a table and the table is accelerated by imparting a shock on the table. The shock induces a rotational acceleration on the disc drive. In such a device, it is desirable that the striking portion of the shocker which strikes the table supporting the disc drive housing, accelerate to full (or acceptable) speed within a desired duration, such as 0.5 milliseconds. It can also be desirable to have hydraulic componentry deliver this acceleration to the system. In such a hydraulic system, a hydraulic valve receives, at an input port, hydraulic fluid under pressure. The valve provides, at an output port, a controlled burst of the hydraulic fluid, based upon a controlled positioning of a valve spool in the hydraulic valve from an off position, to an on position, and back to an off position. In the past, such valves have not been capable of cycling from full off to full on and back to full off, as required to deliver the acceleration to the striking portion of the shocker, within the required time interval.

The present invention includes a disc drive shocker having a fast valve which can be moved from a full on position to a full off position within a desired interval of time to impart a shock to a disc drive. The valve is connected to a valve actuator which moves the valve spool within the valve housing. The valve actuator is connected to the valve spool through a lever. The lever is pivotable about a fulcrum. The pivot point of the fulcrum is adjusted, away from center, such that the end of the lever connected to the valve spool moves more quickly than the end of the lever connected to the valve actuator.

DETAILED DESCRIPTION OF ILLUSTRATIVE EMBODIMENTS

Figure 1:
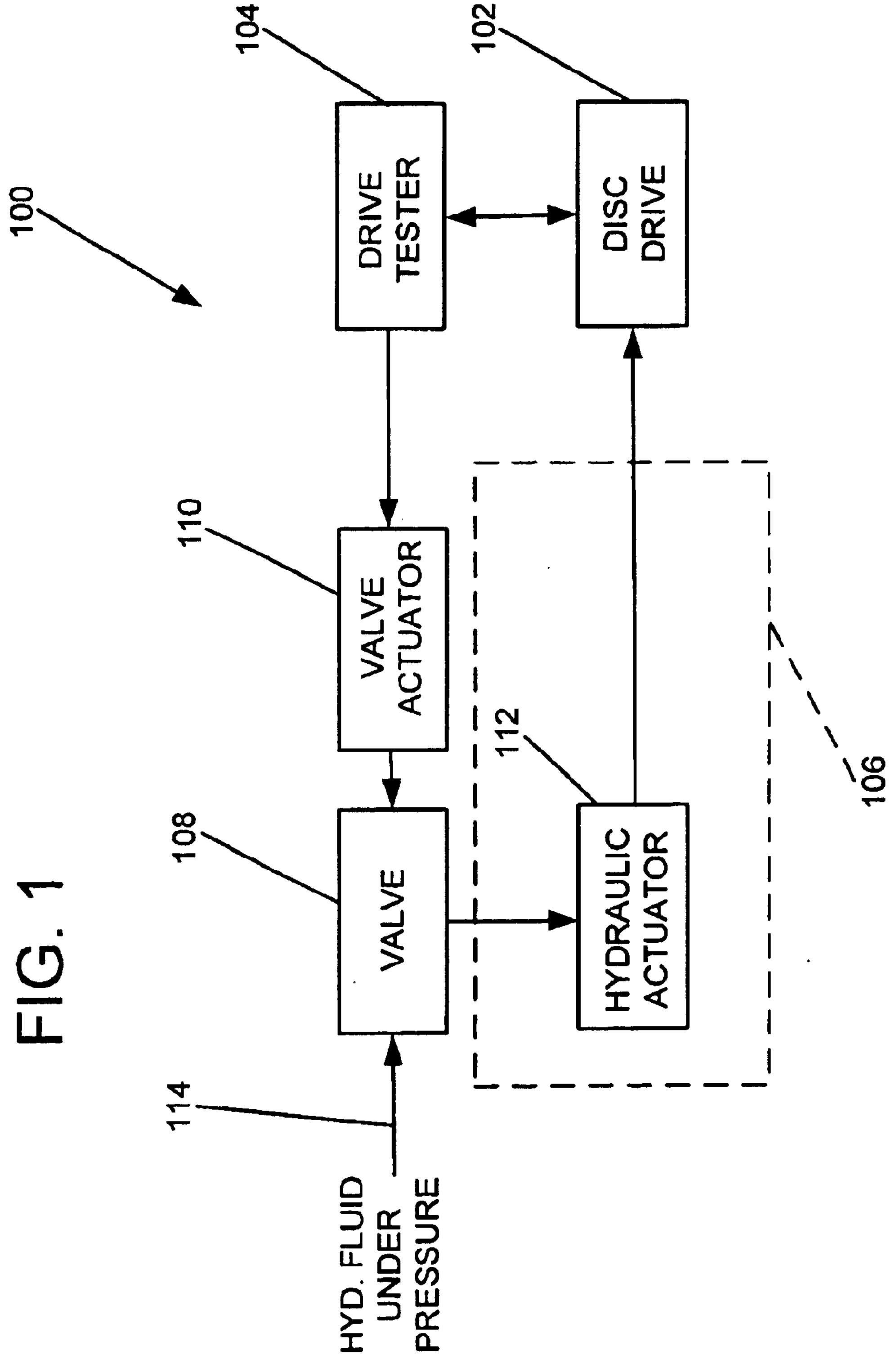
FIG. 1 is a block diagram of a tester in accordance with one embodiment of the present invention.

FIG. 1 is a block diagram of a test system 100 in accordance with one embodiment of the present invention. Test system 100 is configured to test disc drive 102, and includes drive tester 104 and shocker 106. Shocker 106 includes hydraulic valve 108, valve actuator 110 and hydraulic actuator 112.

Valve 108 is, in one illustrative embodiment, a solenoid valve which has a hydraulic fluid inlet 114 and a hydraulic fluid outlet 116. The hydraulic fluid inlet receives hydraulic fluid under pressure from a pump, or another suitable hydraulic system. When moved to an output position (or "on" position) the solenoid valve 108 provides the hydraulic fluid under pressure at its output 116 to hydraulic actuator 112. When in an "off" position, the hydraulic fluid under pressure is diverted to tank (or another portion of the hydraulic system) from inlet 114, or from return ports within solenoid valve 108. This is described in greater detail below.

Hydraulic actuator 112, in one illustrative embodiment, is a hydraulically actuated hammer which accelerates a hammer head, upon receipt of hydraulic fluid pressure from valve 108. In one embodiment, the hammer head is, itself, supported by a pneumatic piston in series with the hydraulic actuator 112. The pneumatic piston is pressurized to a predetermined pressure. The hammer head is directed toward disc drive 102 and imparts a physical shock on the housing, the circuit board, a table supporting the disc drive to induce a rotational shock, or another part of disc drive 102. Changing the pressure in the pneumatic piston allows variation in the shape of the shock pulse imparted on the disc drive. When hydraulic fluid under pressure is not provided from valve 108, the hammer head is retrieved to a pre-shock (or loaded) position in which it is spaced from the disc drive 102.

Valve actuator 110, in one illustrative embodiment, is a hydraulic piston, an air piston, an electrical solenoid, or some other suitable mechanical, pneumatic or electromechanical device for creating translational movement of the spool in valve 108. Valve actuator 110 receives a signal from drive tester 104 (or any other suitable component or entity) causing it to actuate the valve spool (impart translational movement to the valve spool) in valve 108. When valve actuator 110 is a hydraulic piston, the actuator signal from drive tester 104 is a hydraulic fluid under pressure. When valve actuator 110 is an air piston, the signal received from drive tester 104 is a pressurized air signal. Where valve actuator 110 is an electrical solenoid, the actuator signal received from drive tester 104 is an electrical actuator signal causing energization of the electrical solenoid and movement of the spool. Of course, where valve actuator 110 is another type of mechanical, electrical, or electromechanical device, the input signal is adjusted, as appropriate.

During and/or after the physical shock imparted to disc drive 102, drive tester 104 may illustratively be configured to test the operation, or physical integrity, of disc drive 102. This can be done in any suitable manner and does not form part of the present invention.

Figure 2:
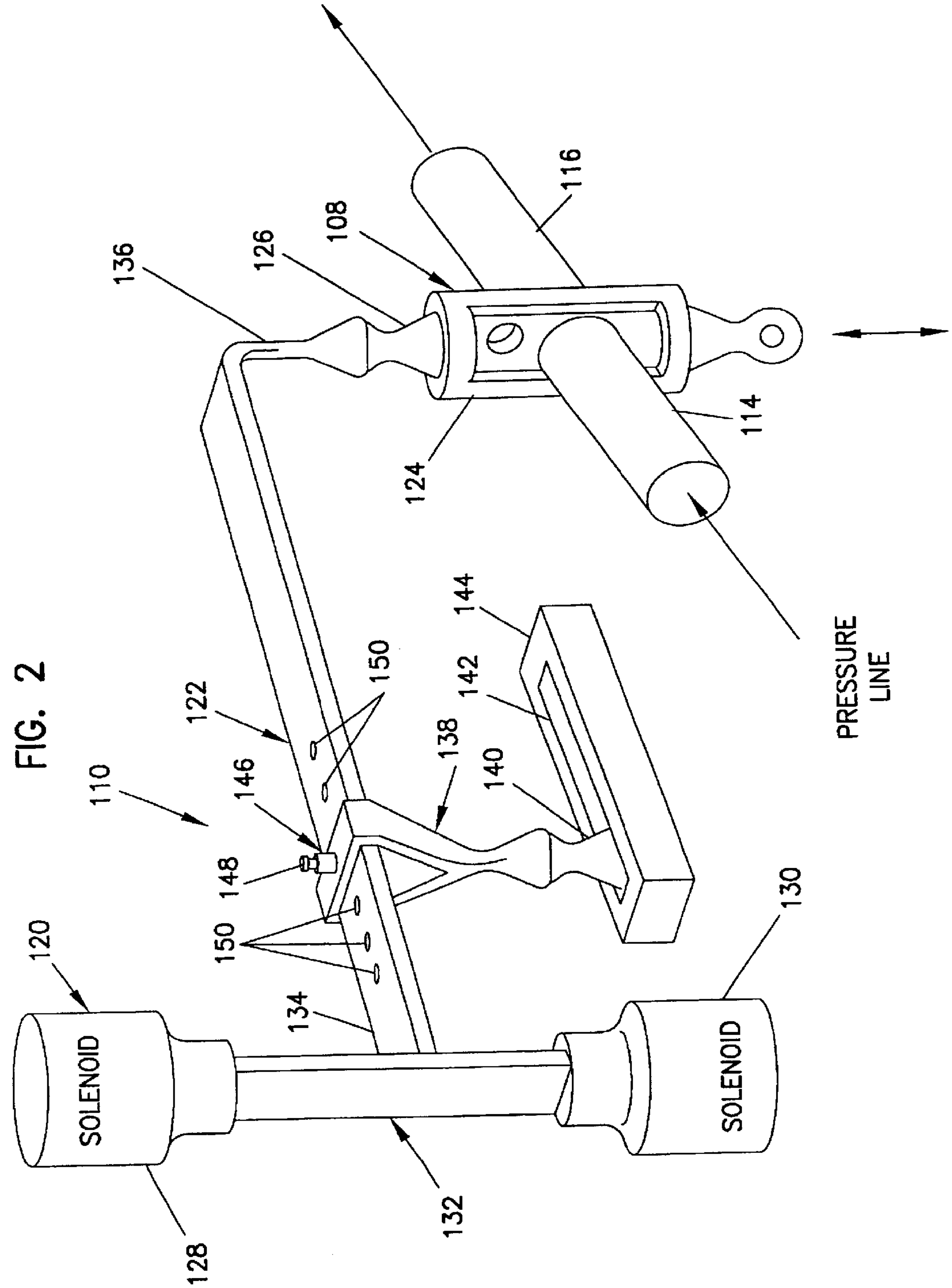
FIG. 2 is a more detailed pictorial diagram illustrating a portion of the shocker in accordance with one embodiment of the present invention.
Figure 3:
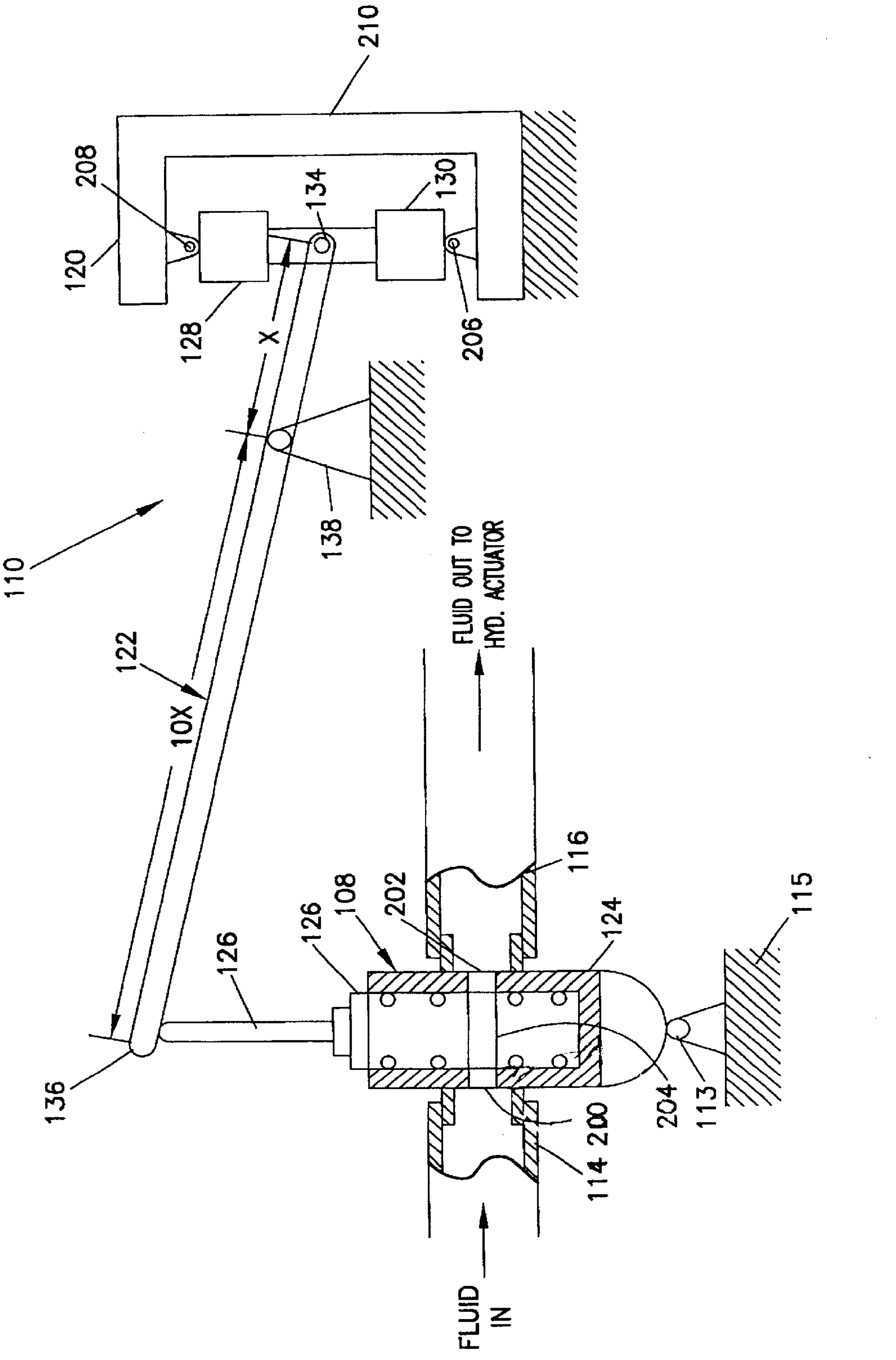
FIG. 3 is similar to FIG. 2, except that the valve is shown in cross section for greater clarity.

FIGS. 2 and 3 are a pictorial representation of a portion of system 100, and a representation showing valve 108 in partial cross section, respectively. Similar items are numbered similarly to those shown in FIG. 1. FIGS. 2 and 3 show that valve actuator 110 includes translational position generator 120, lever 122 and fulcrum assembly 138. FIGS. 2 and 3 also show that valve 108 includes a valve housing 124 and a valve spool 126 slidably movable within housing 124.

In the embodiment illustrated in FIGS. 2 and 3, translational movement generator 120 includes a pair of solenoids 128 and 130 connected through connection mechanism 132, to a first end 134 of lever 122. Lever 122 is connected, at its second end 136, to one end of spool 126.

Lever 122 is also pivotally connected to fulcrum 138. In one embodiment, the position at which fulcrum 138 is connected to lever 122 is variable. Therefore, in one illustrative embodiment, fulcrum 138 includes a base portion 140 which is slidably movable within a slot 142 in housing 144. The upper portion 146 of fulcrum 138 illustratively includes a spring-biased peg 148 which can be withdrawn for positioning along a plurality of apertures 150 in lever 122. When peg 148 is aligned with one of apertures 150, it is spring biased through the aligned aperture 150 to hold lever 122 in pivotal engagement with fulcrum 138.

FIG. 3 illustrates a cross section of valve 108. It can be seen that valve 108 includes an inlet port 200 and an outlet port 202, connected by channel 204 though valve spool 126. When channel 204 is aligned with the inlet and outlet ports, hydraulic fluid under pressure is passed from inlet end 114 to outlet end 116 which provides hydraulic fluid under pressure to hydraulic actuator 112 which, in turn, imparts a physical shock on disc drive 102. However, when channel 204 is moved out of alignment with the inlet and outlet ports 200 and 202, respectively, no hydraulic fluid under pressure is passed to outlet end 116.

As perhaps best illustrated in FIG. 3, the length of lever 122 between translational movement generator 120 and fulcrum 138 is, illustratively, a distance X. Also, the length of lever 122 between fulcrum 138 and valve spool 126 is, illustratively, greater than X, such as some multiple of X (e.g. 10X). This means that the linear speed at which end 136 moves valve spool 126 is ten times the linear speed at which end 134 of lever 122 is moved. Therefore, solenoids 128 and 130 can be relatively low speed solenoids, yet still achieve the desired pulse duration of hydraulic fluid through valve 108.

In operation, solenoids 128 and 130 are illustratively either both push-type solenoids, or both pull-type solenoids. They are both illustratively pivotally connected at connection points 206 and 208 to a support 210 such that they can accommodate the arc though which end 134 will travel as it pivots about fulcrum 138. Valve 108 is also illustratively pivotally connected by pivot 113, to a support structure 115, such that it can accommodate the arc through which end 136 of lever 122 moves.

Valve 108 is also illustratively designed so that it is off in its top and bottom positions, but so that it is on in an intermediate position, between the top and bottom positions. When the actuator is triggered, spool 126 passes from full off through full on, back to a full off position at the opposite end of its travel.

In order to impart a physical shock to disc drive 102, the actuator is triggered such that one of the solenoids is actuated to move end 134 about its arc. This, in turn, causes valve spool 126 to be moved from one extreme end of travel to the other extreme end of travel. As channel 204 moves from one extreme end of travel (e.g., from the off position in disalignment with inlet and outlet 200 and 202, respectively) to an on position (e.g., in alignment with inlet 200 and outlet 202) and again to an off position at the other extreme end of travel of valve spool 226 (in which channel 204 is again out of alignment with the inlet and outlet 200 and 202 respectively) this causes a momentary pulse of hydraulic pressure to be passed from inlet 114 to outlet 116 and, in turn, to actuator 112. In order to administer another pulse, the opposite solenoid 128 or 130 is energized, causing end 134 of lever 122 to move about the arc again, in an opposite direction. Of course, this causes valve spool 126 to move from one extreme end of travel, in the opposite direction, to the other extreme end of travel, momentarily aligning channel 204 with inlet 200 and outlet 202, to administer a brief pulse of hydraulic fluid.

It can thus be seen that the system can be varied (such as through movement of fulcrum 138 relative to lever 122, and such as by changing solenoids 128 and 130 to provide different input forces or speeds to end 134) in order to achieve a wide variety of fluid pulse widths.

Figure 4:
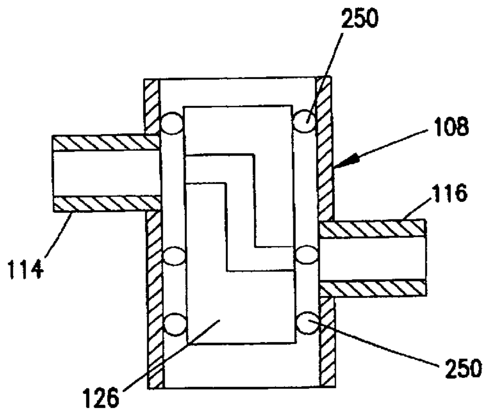
FIGS. 4 and 5 illustrate a plurality of different valve arrangements in accordance with one embodiment of the present invention.
Figure 5:
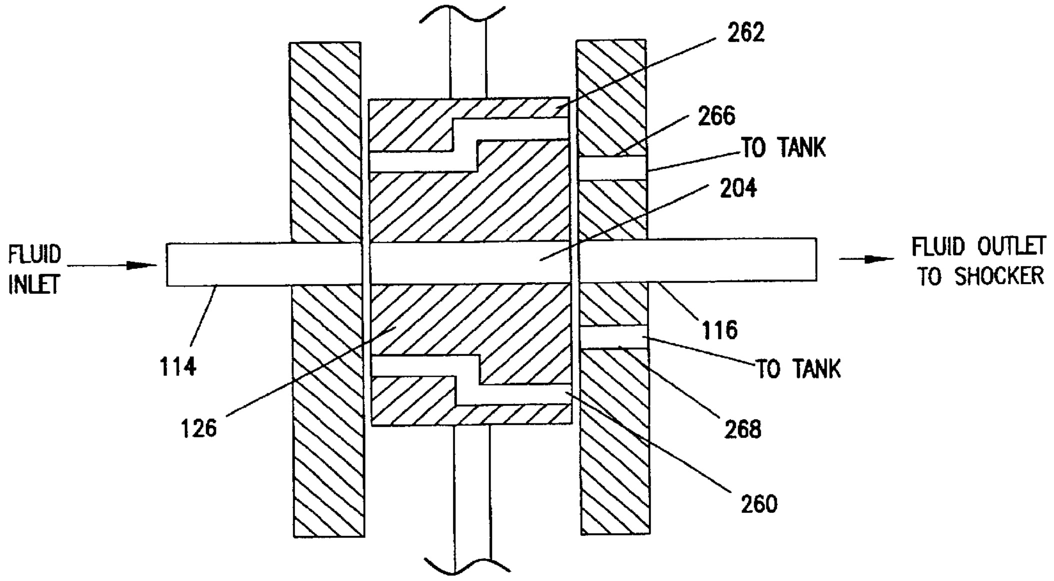

FIGS. 4 and 5 illustrate two of a variety of different embodiments for valve 108. In the embodiment illustrated in FIG. 4, channel 204 is not a straight channel but is instead a tortuous channel. FIG. 4 also illustrates a plurality of gaskets 250 about the outer periphery of spool 126 between spool 126 and housing 124. FIG. 5 illustrates that valve spool 126 has three channels 204, 260 and 262. Therefore, when in its off positions (at its extreme ends of travel) either channels 260 or 262 are aligned with the fluid inlet 114. Those channels, however, do not provide fluid under pressure to outlet 116, but provide it to one of two alternate ports 266 or 268. These ports provide the fluid under pressure back to tank such that the fluid under pressure need not be diverted by some assembly or plumbing upstream of valve 108.

It should also be noted that valve 108 can either be an open center valve or a closed center valve, as desired. Appropriate plumbing changes can be made to accommodate the different valve arrangements.

Further, while valve actuator 110 is shown as including solenoids, a lever and a fulcrum, it can, of course, include other actuators and another accelerator for increasing the speed of the solenoid (or other actuator) output to control the hydraulic valve quickly. Such an accelerator or speed increaser may include, for example, a rotatable shaft and gears with a ratio that increases the speed input by the shaft, a cam arrangement or other such system.

A disc drive shocker or impactor 106 provides an impact to a disc drive 102. The impactor illustratively comprises an actuator 112, a valve 108 having a fluid inlet 114, a fluid outlet 116 coupled to the actuator 112, and a valve spool 126 movable from an on position in which a fluid passage 204 is provided from the inlet 114 to the outlet 116 and an off position in which fluid is blocked from passing from the inlet 114 to the outlet 116. The impactor also illustratively includes a valve actuator 110 coupled to the valve 108 to move the valve spool 126 between the on and off positions, the valve actuator 116 including a fulcrum 138, an arm actuator 120, and an arm 122 pivotally connected to the fulcrum 138 and having a first end 136 coupled to the valve spool 126 and a second end 134 coupled to the arm actuator 120.

In one embodiment, the arm comprises a first arm portion between the fulcrum 138 and the first end 136 and a second arm portion between the fulcrum 138 and the second end 134, the first arm portion being longer than the second arm portion.

In one embodiment the first arm portion is approximately ten times longer than the second arm portion.

In one embodiment the arm actuator 120 comprises a first arm actuator 128 coupled to the second end of the arm to pivot the second end of the arm 122 about the fulcrum 138 in a first direction; and a second arm actuator 130 coupled to the second end of the arm 122 to pivot the second end of the arm about the fulcrum 138 in a second direction generally opposite the first direction.

In another embodiment, the arm 120 includes a plurality of apertures 150 along the length thereof and wherein the fulcrum 138 is disconnectably coupled to one of the plurality of apertures.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the valve assembly while maintaining substantially the same functionality without departing from the scope and spirit of the present invention. In addition, although the preferred embodiment described herein is directed to a solenoid and fulcrum system, it will be appreciated by those skilled in the art that the teachings of the present invention can be applied to other systems, like gear or cam systems applied to optical disc players or other electronic test systems, without departing from the scope and spirit of the present invention.

What is claimed is:

1. An impact tester for impact testing a test specimen, comprising:

a fluid line containing a pressurized fluid;

a valve, comprising an open position and a closed position, in the fluid line defining an upstream portion of the fluid line containing the pressurized fluid and a downstream portion of the fluid line isolated from the pressurized fluid in the closed position of the valve and in fluid communication with the pressurized fluid in the open position of the valve;

an actuator momentarily moving the valve to the open position independently of an upstream portion pressurized fluid pressure, admitting a burst of pressurized fluid into the downstream portion of the fluid line; and an impact device accelerated by the burst of pressurized fluid to impact against the test specimen.

2. The impact tester of claim 1 wherein the test specimen is a disc drive.

3. The impact tester of claim 1 wherein the actuator comprises a fulcrum, an arm actuator, and an arm pivotally connected to the fulcrum and having a first end coupled to a valve spool of the valve and a second end coupled to the arm actuator.

4. The impact tester of claim 3 wherein the arm comprises:

a first arm portion between the fulcrum and the first end and a second arm portion between the fulcrum and the second end, the first arm portion being longer than the second arm portion.

5. The impact tester of claim 4 wherein the first arm portion is approximately ten times longer than the second arm portion.

6. The impact tester of claim 3 wherein the arm actuator comprises:

a first arm actuator coupled to the second end of the arm to pivot the second end of the arm about the fulcrum in a first direction; and a second arm actuator coupled to the second end of the arm to pivot the arm about the fulcrum in a second direction generally opposite the first direction.

7. The impact tester of claim 6 wherein the first and second arm actuators are solenoids.

8. The impact tester of claim 6 wherein the first and second arm actuators are pneumatic pistons.

9. The impact tester of claim 3 wherein the arm has a length and is adjustably coupled to the fulcrum along the length of the arm.

10. The impact tester of claim 9 wherein the arm includes a plurality of apertures along the length thereof and wherein the fulcrum is disconnectably coupled to one of the plurality of apertures.

11. A method of impacting a test specimen, the method comprising:

(a) providing a fluid line containing a pressurized fluid, the fluid line having a valve that defines an upstream portion and a downstream portion in the fluid line, the valve comprising an open position in which a fluid passage is provided from the upstream portion to the downstream portion and a closed position in which the pressurized fluid is blocked from passing from the upstream to the downstream portion;

(b) momentarily moving the valve to the open position, independently of an upstream portion pressurized fluid pressure, to admit a burst of pressurized fluid into the downstream portion of the fluid line, the downstream portion of the fluid line directing the burst of pressurized fluid to an impact device which is accelerated by the burst of pressurized fluid to impact against the test specimen.

12. The method of claim 11 wherein the test specimen is a disc drive.

13. The method of claim 11 wherein the momentarily moving the valve step (c) is carried out by an actuator, and wherein the actuator comprises a fulcrum, an arm actuator, and an arm pivotally connected to the fulcrum and having a first end coupled to a valve spool of the valve and a second end coupled to the arm actuator.

14. The method of claim 13 wherein the arm comprises:

a first arm portion between the fulcrum and the first end and a second arm portion between the fulcrum and the second end, the first arm portion being longer than the second arm portion.

15. The method of claim 14 wherein the first arm portion is approximately ten times longer than the second arm portion.

16. The method of claim 13 wherein the arm actuator comprises:

a first arm actuator coupled to the second end of the arm to pivot the second end of the arm about the fulcrum in a first direction; and a second arm actuator coupled to the second end of the arm to pivot the arm about the fulcrum in a second direction generally opposite the first direction.

17. The method of claim 16 wherein the first and second arm actuators are solenoids.

18. The method of claim 16 wherein the first and second arm actuators are pneumatic pistons.

19. The method of claim 13 wherein the arm has a length and is adjustably coupled to the fulcrum along the length of the arm.

20. The method of claim 19 wherein the arm includes a plurality of apertures along the length thereof and wherein the fulcrum is disconnectably coupled to one of the plurality of apertures.

* * * * *